United States Patent [19]

Matsui et al.

[11] Patent Number: 5,184,038
[45] Date of Patent: Feb. 2, 1993

[54] METHOD OF COUPLING MAGNETIC POSITION DETECTING DEVICE WITH BRUSHLESS DC MOTOR AND THE COUPLING STRUCTURE THEREOF

[75] Inventors: Masahiro Matsui, Akashi; Yasuhiko Hashimoto, Kobe, both of Japan

[73] Assignee: Kawasaki Jukogyo Kabushiki Kaisha, Hyogo, Japan

[21] Appl. No.: 839,264

[22] Filed: Feb. 20, 1992

Related U.S. Application Data

[63] Continuation of Ser. No. 644,977, Jan. 23, 1991, abandoned.

[30] Foreign Application Priority Data

Jan. 23, 1990 [JP] Japan .................................. 2-14174
Nov. 29, 1990 [JP] Japan .................................. 2-334871

[51] Int. Cl.[5] .......................................... H02K 15/00
[52] U.S. Cl. ..................................... 310/42; 310/177; 310/68 B
[58] Field of Search ................. 310/42, 66, 68 B, 177, 310/178

[56] References Cited

FOREIGN PATENT DOCUMENTS 1577275 10/1980 United Kingdom .................. 310/42

Primary Examiner—Emanuel T. Voeltz
Assistant Examiner—Judson H. Jones
Attorney, Agent, or Firm—Wenderoth, Lind & Ponack

[57] ABSTRACT

A magnetic pole position detecting device is coupled with a brushless dc motor by determining the angular positional relationship between an input shaft of a rotor, a detecting device body, and a locating mark formed on a detecting device casing by outputting absolute values indicative of the angular position of the rotor, coupling an output shaft of the brushless dc motor with the rotor of the detecting device, driving the dc motor externally, and forming another locating mark on the motor casing in alignment with the locating mark formed on the detecting device casing, under a condition in which the angular positional relationship between the motor casing and the detecting device casing is so determined that motor induced voltage is in phase with waveform of the absolute values output. Therefore, it is possible to easily replace the magnetic pole position detecting device with a new one in a short time at any job site, independently from the motor.

2 Claims, 8 Drawing Sheets

METHOD OF COUPLING MAGNETIC POSITION DETECTING DEVICE WITH BRUSHLESS DC MOTOR AND THE COUPLING STRUCTURE THEREOF

This application is a continuation of now abandoned application Ser. No. 07/644,977, filed Jan. 23, 1991 now abandoned.

BACKGROUND OF THE INVENTION

The present invention relates to a method of coupling a magnetic pole position detecting device with a brushless dc motor and a coupling structure therefor.

In a brushless motor, since it is necessary to electronically switch the exciting current phase according to rotor angular position during operation, it is particularly essential to detect the rotor magnetic pole angular position as precisely as possible with a magnetic pole position detecting device. When the pole position cannot be detected precisely, there arise various problems in that unavailable components of the ting current increase, motor efficiency (output), decreases; abnormal heat is generated, and motor speed increases abnormally (run-away operation) at the worst. Therefore, it is particularly important to couple the magnetic pole position detecting device with the dc motor at a predetermined angular position about a motor axis.

The above-mentioned magnetic pole position detecting device coupled to the brushless dc motor is an electronic device such as encoder or resolver, which is usually assembled accurately by manually adjusting the angular position of the detecting device relative to the dc motor. Therefore, once trouble occurs, in most cases the detecting device is replaced with a new one together with the dc motor, thus resulting in loss in labor and cost. This is because once only the magnetic pole position detecting device is removed from the dc motor for replacement, it is necessary to align both the angular positions again and protect the detecting device from dust, with the result that it is impossible to repair the detecting device in a short time.

A typical prior art method of coupling a magnetic pole detecting device with a dc motor will be explained with reference to FIGS. 1 to 4. In FIG. 1, a marking-off line 5 is scribed on an end surface of a casing 1 of a brushless dc motor, and a key 3 is pressure-fitted into a key groove 4 formed in a motor output shaft 2 as shown in FIG. 2 so that a predetermined angular position of the motor output shaft 2 can be set on the basis of the scribed marking-off line 5. In the same way, another marking-off line 14 is scribed on an end surface of a magnetic pole position detecting device 6 and another key 10 is pressure-fitted into another key groove 9 formed in a detecting device input shaft 8 as shown in FIG. 3. Further, a shaft coupling member 7 is formed with a central through hole 11 and a key groove 12 as shown in FIG. 4. Therefore, the detecting device 6 is coupled to the dc motor via the shaft coupling member 7 by matching each key 3 or 10 with each marking-off line 5 or 14 and fitting each key 3 or 10 into the key groove 12 formed in the shaft coupling member 7.

However, in the prior-art method as described above; since the shaft coupling member 7 is used, there exists a problem in that the axial length is large and therefore the rigidity between the motor shaft and the detecting device shaft is low. In addition, since the two shafts are coupled with each other at two different positions via two different keys play (looseness) is inevitably produced and additionally the forming of the key groove results in a high cost.

SUMMARY OF THE INVENTION

The object of the present invention is to provide a method of coupling a magnetic pole position detecting device to a brushless dc motor and a coupling structure therefor, by which the magnetic pole position detecting device can be easily replaced with a new one in a short time at any job site, without increasing the size or dimensions of the brushless dc motor.

To achieve the above-mentioned object, the present invention provides a method of coupling a magnetic pole position detecting device with a brushless dc motor, comprising the steps of:

(a) determining mutual angular positional relationships among a rotor part of the detecting device, a stator part of the detecting device and a locating mark formed on a detecting device casing of a magnetic pole position detecting the stator part of the detecting device having means for outputting absolute values indicative of the angular position of the rotor part of the detecting device relative to the detecting device casing;

(b) coupling an output shaft of the brushless dc motor with the rotor part of the detecting device of the magnetic pole position detecting device;

(c) rotating the dc motor shaft externally; and (d) forming another locating mark on the motor casing in alignment with the mark formed on the detecting device casing, under the condition that the mutual angular positional relationship between the motor casing and the detecting device casing is determined so that a back E.M.F. waveform of the motor and a waveform of the absolute values output by the detecting device are in phase.

According to the present invention, the output shaft of the brushless dc motor is coupled with the rotor part of the detecting device of the magnetic pole position detecting device without circumferential looseness between the two shafts; in this coupling state, the output shaft of the motor is driven by another driving motor; and another locating mark is formed on the motor casing by adjusting the mutual angular positional relationship between the motor casing and the detecting device casing in such a way that back E.M.F. of the motor stator coil is in phase with the waveform of absolute values output from the detecting device body. Therefore, in case trouble occurs int he magnetic pole position detecting device, the magnetic pole position detecting device is removed from the motor casing, and a new detecting device is coupled with the motor casing so that the locating mark formed on the detecting device is aligned with the locating mark formed on the motor casing. Therefore, it is possible to replace the magnetic pole detecting device with a new one easily in a short time at any job site.

Further, in the method of coupling the dc motor with the detecting device according to the present invention, a cylindrical pin is attached to one end of either the motor output shaft or the detecting device input shaft in such a way that the pin projects in the radial direction of the input or output shaft; additionally, the pin is split in the circumferential direction thereof so as to be elastically expansible int he radial direction thereof; and axle hole is formed in the end of the other of the motor output shaft or the detecting device input shaft in such a way that the ends of the two shafts can be fitted together; and further, a groove extends in an inner circumferential surface defining the axle hole in such a way that the cylindrical pin can be received int he groove. Therefor, the shaft coupling structure can be small, in particular in the axial dimension thereof, and facilitates the coupling of the dc motor to the magnetic pole positions detecting device.

In the coupling method and the structure according to the present invention, since it si possible to manufacture, transport, and store than dc motor an the magnetic pole position detecting device separately, it is unnecessary to always handle the detecting device together with the dc motor, so that it is possible to markedly simplify the handling work of these repair parts.

DETAILED DESCRIPTION OF THE PREFERRED EMBODIMENT

Figure 1:
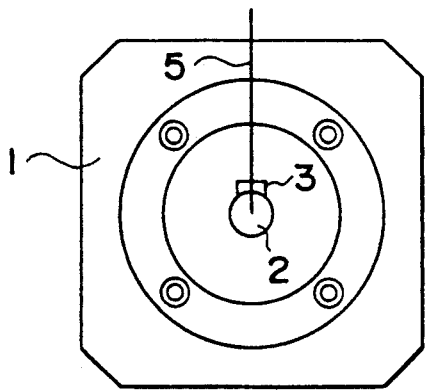
FIG. 1 is a front view of a prior art brushless dc motor 1.
Figure 2:
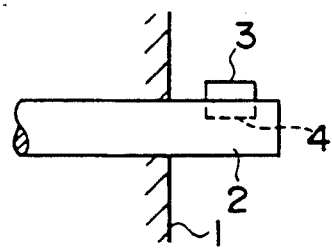
FIG. 2 is a longitudinal view of an output shaft 2 of the motor 1 shown in FIG. 1.
Figure 3:
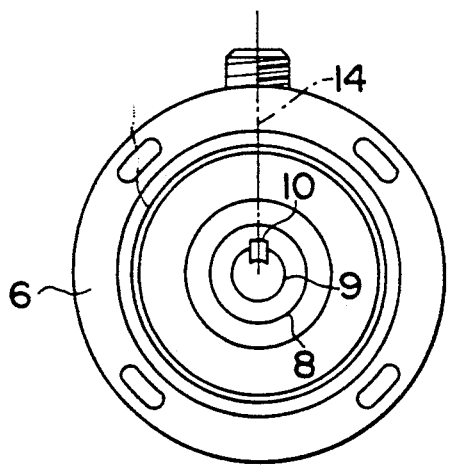
FIG. 3 is a front view of a prior art magnetic pole position detecting device 6.
Figure 4:
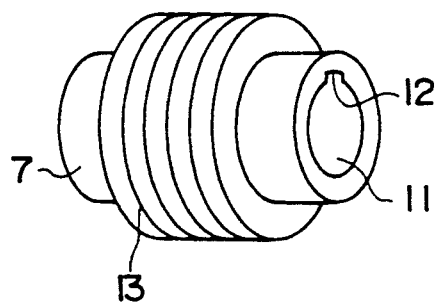
FIG. 4 is a perspective view of a shaft coupling member 7 used for coupling the prior art motor and the detecting device.
Figure 5:
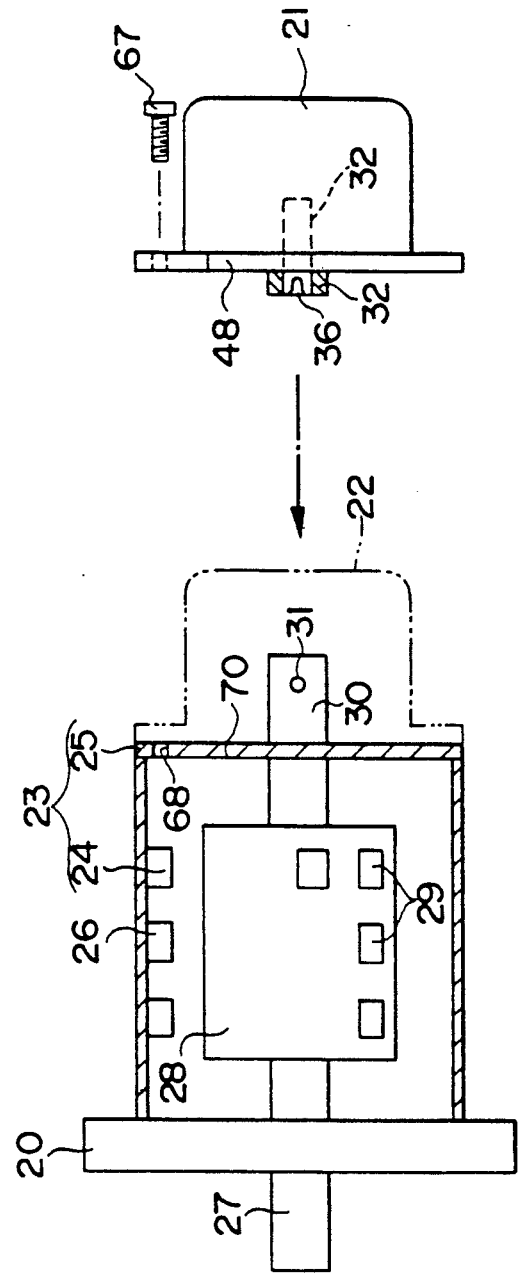
FIG. 5 is a diagrammatical cross-sectional view of an embodiment of the brushless dc motor and the magnetic pole position detecting device according to the present invention.

FIG. 5 shows an embodiment of the present invention, in which a brushless dc motor 20 and a magnetic pole position detecting device 21 are shown in a disassembled state. The dc motor 20 and the detecting device 21 are removably coupled to each other. The phantom lines 22 show the state in which the detecting device 21 is couple to the motor 20. A motor casing 23 of the brushless dc motor 20 comprises a motor casing body 24 and a rear cover 25 fixed to the casing body 24. Stator coils 26 are attached to an inner circumferential surface of the motor casing body 24, and permanent magnet pieces 29 are bonded onto an outer circumferential surface of a rotor 28 fixed to an output shaft 27.

A radially extending pin 31 is fixed to an axial end portion 30 of the output shaft 27 on the side of the magnetic pole position detecting device 21. This metallic pin 31 projects in the radial direction from the end portion 30 of the motor output shaft and further is split along the circumferential direction thereof so as to be elastically expansible in the radial direction of the pin. Therefore, when this radially extending pin 31 is fitted to a radial groove 36 formed in an axial end portion of an input shaft (rotor part of the detecting device) 32 of the magnetic pole position detecting device 21, it is possible to realize a looseless shaft coupling structure.

Figure 6:
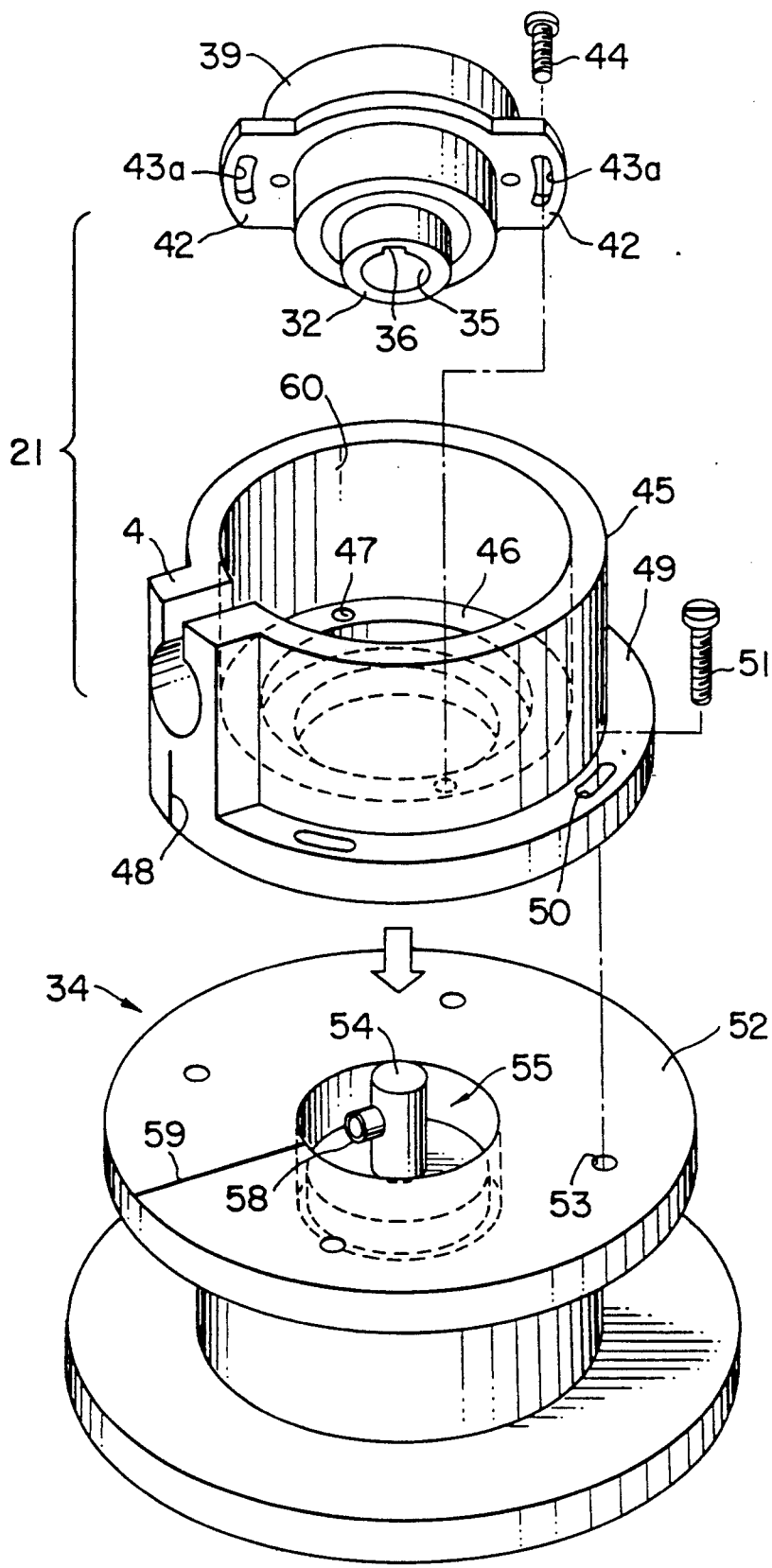
FIG. 6 is an exploded view of the magnetic pole detecting device 21 and a detecting device assembly jig 34.
Figure 7:
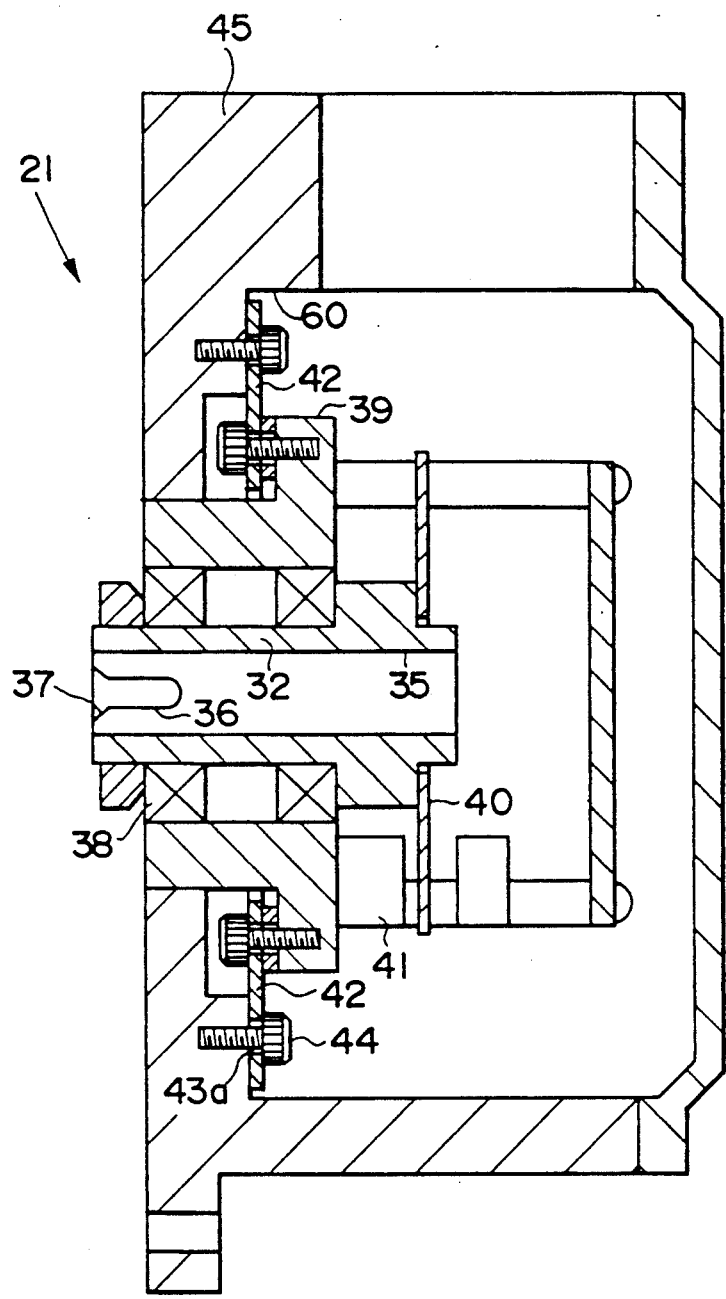
FIG. 7 is a cross-sectional view of the magnetic pole position detecting device 21.
Figure 8:
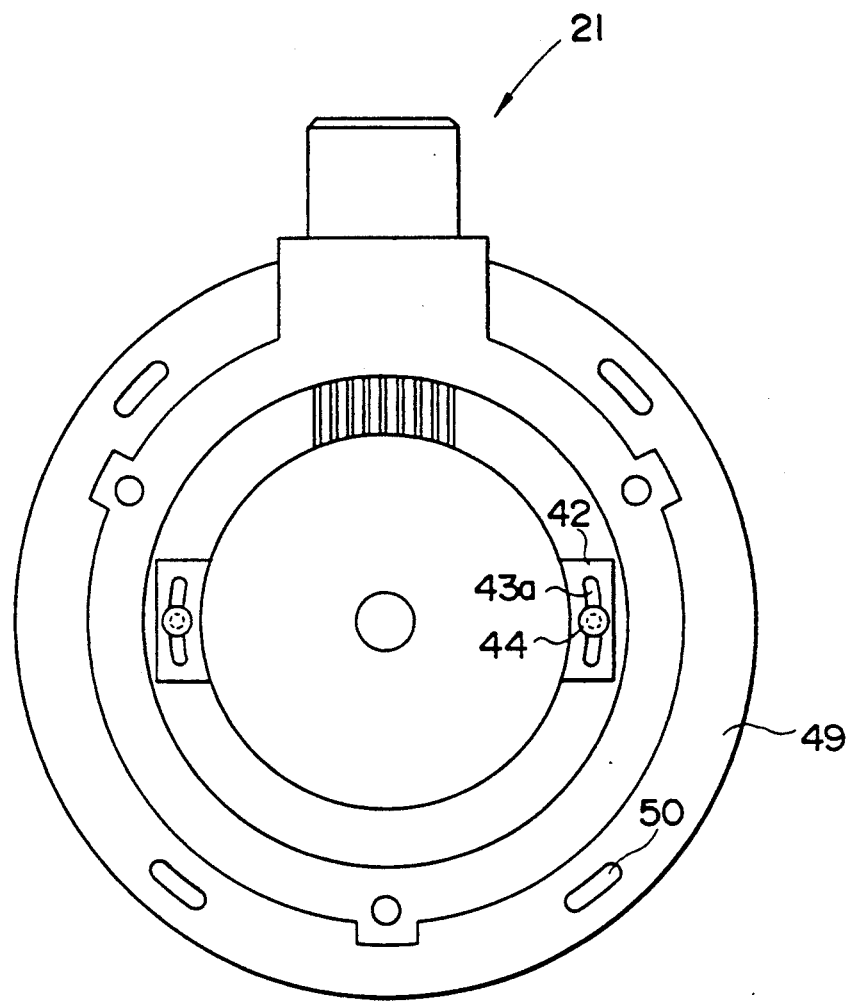
FIG. 8 is a front view of the magnetic pole position detecting device 21.

FIG. 6 is an exploded view of the magnetic pole position detecting device 21 and an assembling jig 34 therefor. FIG. 7 is a cross-sectional view of an optical encoder type of magnetic pole positions detecting device 21, by way of example; and FIG. 8 is a front view of the same. With reference to these drawings, an input shaft 32 of the magnetic pole position detecting device 21 is formed with a shaft hole 35 into which the output haft 27 of the dc motor 20 is tightly fitted. Further, the groove 36 is formed in the inner circumferential surface of the input shaft 32 so as to extend in the axial direction thereof (in the horizontal direction in FIG. 7) and widen axially outwardly (outside end surfaces 37 defining the end of the groove 36 are inclined in the vertical direction of FIG. 7). Therefore, when the axial end portion 20 of the motor output shaft 27 is coupled to the input shaft 32, the radially extending motor pin 31 is guided by the end surfaces 37 deep into the groove 36 of the input shaft 32. Therefore, it is possible to removably couple the motor output shaft 27 to the input shaft 32 without looseness along the circumferential direction thereof or at a predetermined angular position with respect to each other.

The input shaft 32 is rotatably supported by a bearing 38 within a detecting device body (stator part of the detecting device) 39, and a rotation detecting plate 40 is fixed to the input shaft 32 with a predetermined angular positional relationship with respect to the groove 36. Further, detecting elements 41 are fixed to the detecting device body 39 in correspondence to the rotation detecting plate 40 so that an output signal indicative of the absolute value of the angular position of the groove 36 can be obtained by the detecting elements 41. An elastic mounting plate member 42 is fixed to the detecting device body 39. This mounting plate member 42 is formed with two circumferentially extending slots 43a. Therefore, the rotation detecting plate 40, the detecting elements 41, and the mounting plate member 42 collectively form an integral part of the detecting device body 39. On the other hand, a detecting device casing 45 is formed with an inner flange 46 having two threaded holes 47 and an outer flange 49 having four circumferentially extending slots 50. Therefore, the detecting device body 39 and the detecting device casing 45 can be fixed to each other by passing bolts 44 through the slots 43a of the mounting plate member 42 and then screwing the bolts 44 into the threaded holes 47 of the inner flange 46, in such a way that the mutual angular position thereof can be adjusted. Further, an angular position locating mark 48 is scribed on an outer circumferential wall of the detecting device casing 45 along the axial direction thereof.

Figure 9:
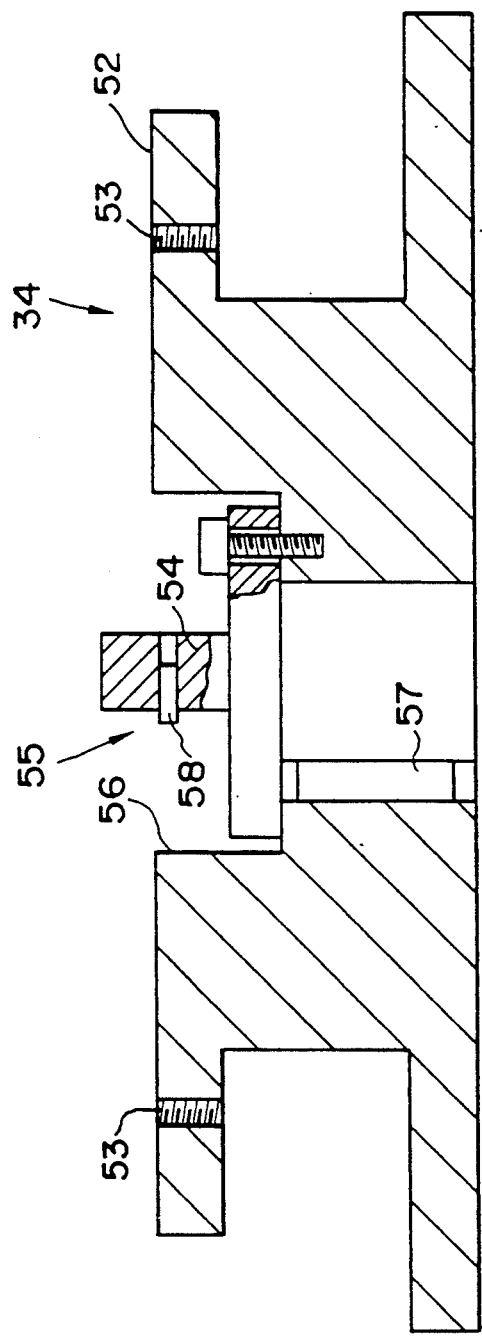
FIG. 9 is a cross-sectional view of the assembly jig 34.
Figure 10:
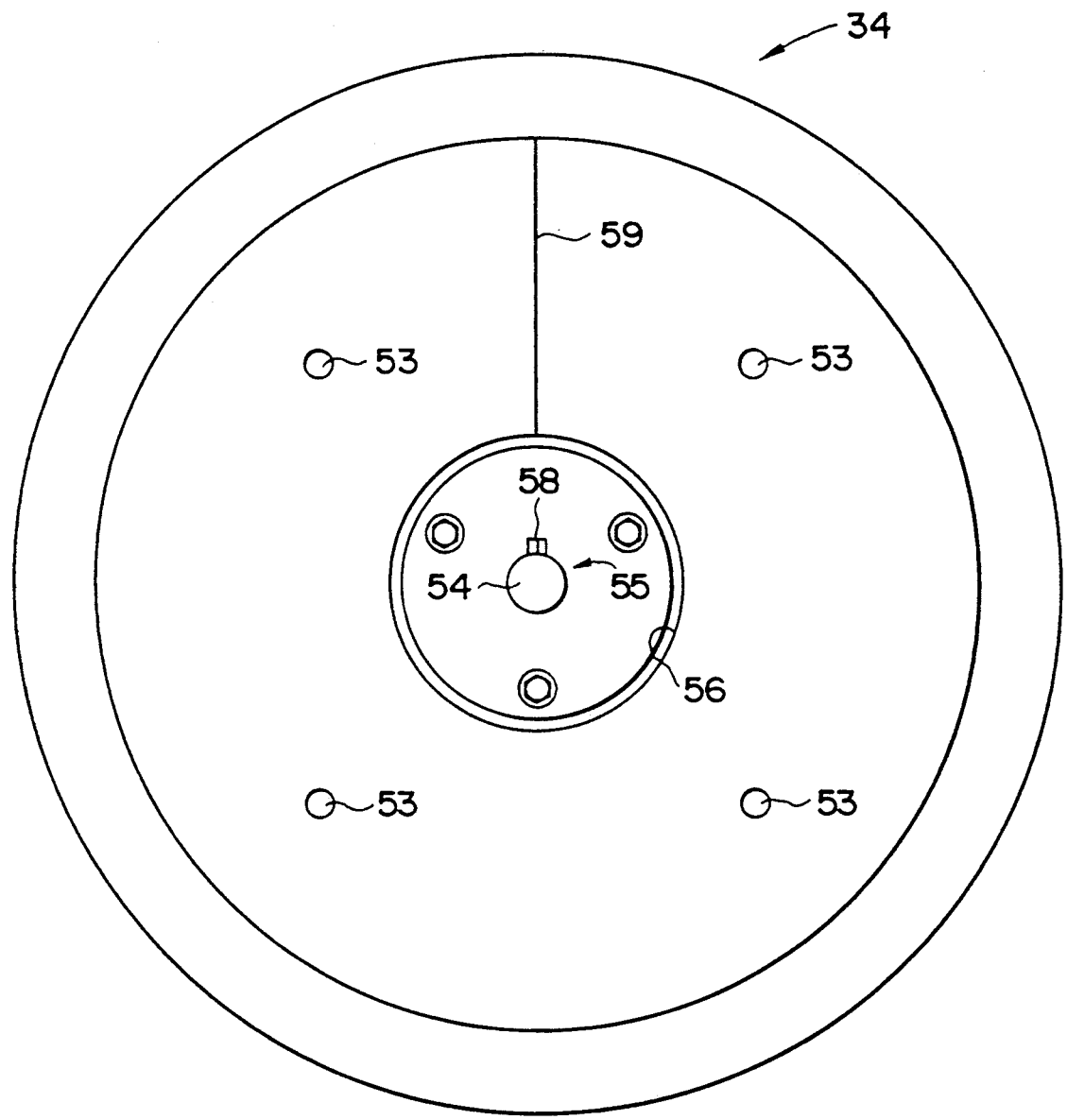
FIG. 10 is a plan view of the assembling jig 34.

FIG. 9 is a cross-sectional view of the jig 34 and FIG. 10 is a plan view of the same. The assembling jig 34 is formed with an upper base plate 52 and an axially extending central axle end member 54. This axle end member 54 is fitted into a central recessed portion 56 formed in the base plate 52 and fixed thereto via a key 57. Further, four threaded holes 53 are formed in the upper end surface of the base plate 52. Therefore, the detecting device casing 45 is removably fixed to the assembling jig 34 by passing bolts 51 through the slots 50 of the outer flange 49 of the device casing 45 and then screwing the same bolts 51 into the threaded holes 53 of the base plate 52 of the jig 34.

On the other hand, the axle end member 54 is constructed in the same way as the axle end portion 30 of the output shaft 27 of the dc motor 20. That is, an axially split pin 58 is fixed to the axle end member 54 so as to project radially therefrom in the same way as the motor pin 31. Further, an angular position locating mark 59 is scribed on the surface of the base plate 52 so as to extend in the radial direction thereof.

The assembling procedure of the magnetic pole position detecting device will be explained hereinbelow. First, the detecting device casing 45 is mounted on the base plate 52 of the assembly jig 34; the bolts 51 are passed through the slots 50 and then screwed loosely into the threaded holes 53; the two locating marks 48 and 59 are aligned with each other; and the bolts 51 are screwed tightly to fix the detecting device casing 45 to the base plate 52 of the jig 34. Thereafter, the detecting device body 39 is fitted into a recessed portion 60 of the detecting device casing 45 to mount the mounting plate member 42 on the inner flange 46; the axle end member 54 of the jig 34 is tightly fitted into the axle hole 35 of the input shaft 32 of the device body 39 to place the radially extending pin 58 within the groove 36 of the device input shaft 32 and thereby couple the device input shaft 32 with the jig axle end member 54. Under these conditions, the angular position of the detecting device body 39 is adjusted until the absolute value output signal obtained by the detecting elements 41 of the detecting device body 39 indicates a predetermined level. After adjustment, the bolts 44 are passed through the slots 43a of the mounting plate member 42 and are then tightly screwed into the threaded holes 47 of the inner flange 46 to fix the detecting device body 39 to the detecting device casing 45. By the above-mentioned procedure, the mutual angular positional relationship among the locating mark 48 of the detecting device casing 45, the groove 36 of the input shaft 32, and the detecting elements 41 of the detecting device body 39 can be determined accurately.

The method of assembling the brushless dc motor will be described hereinbelow with reference to FIG. 5. In this case, being different from the magnetic pole position detecting device, it is impossible to accurately determine the mutual angular positional relationship among the motor output shaft pin 31, the magnetic pieces (poles) 29, and the locating mark 70 scribed on the motor rear cover 25 on the basis of only the mechanical dimensions or static assembly work. This is because it is difficult to attach the magnetic pieces 29 on the rotor 29 with high positional precision and additionally the true magnetic pole positions are determined by dynamic characteristics such as electromagnetic forces generated between the stator coils 26 and the rotor magnet pieces 29.

Therefore, after the motor has been assembled with relatively low mechanical precision, the mutual angular positional relationship among the motor pin 31, the magnetic pole (29) pieces, and the locating mark 70 is determined at higher precision, by scribing a new locating mark indicative of a true magnetic pole position on the motor casing 23 under the condition that the motor 20 is coupled to the magnetic pole position detecting device 21.

Figure 11:
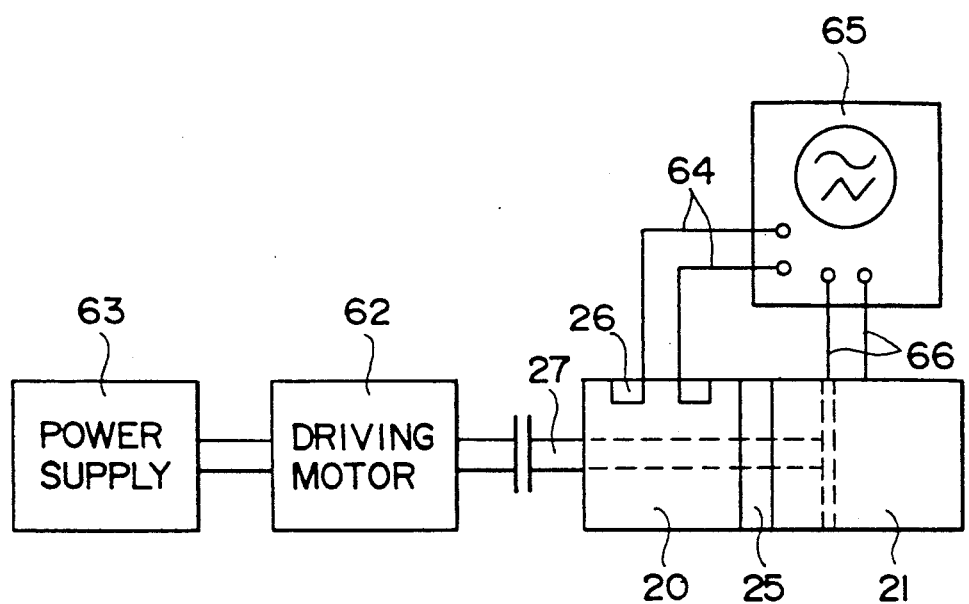
FIG. 11 is a schematic diagram of a system for performing the mounting procedure between the brushless dc motor 20 and the magnetic pole position detecting device 21.

This procedure will be described hereinbelow. The end portion 30 of the motor output shaft 27 is fitted to the axle hole 35 of the input shaft 32 of the magnetic pole position detecting device 21 to place the motor pin 31 within the device groove 36, so that the motor output shaft 27 is coupled with the device input shaft 32. Under these conditions, the output shaft 27 of the dc motor 20 is driven by another driving motor 62 connected to a power supply 63 in order to drive the motor 20 at a predetermined rotative speed, as shown in FIG. 11. In this case, since an induced voltage is generated from the stator coils 26 of the motor 20, it is possible to observe the waveform of the induced voltage applied through two lines 64 on a display of an oscilloscope 65. Simultaneously, since it is possible to observe the waveform of the output signals from the detecting elements 41 of the magnetic pole position detecting device 21 through two lines 66, the mutual angular position between the motor casing 23 of the motor 20 and the detecting device casing 45 of the detecting device 21 can be adjusted so that the induced voltage signal waveform of the motor 20 is in phase with that of the detecting device 21, and thereafter the detecting device casing 45 is fixed to the motor casing 23 by passing bolts 67 (shown in FIG. 5) through the slots 50 (shown in FIG. 6) of the device casing 45 and then screwing them into the threaded holes 68 (shown in FIG. 5) of the motor rear cover 25.

Under these conditions, the radially extending locating mark 70 scribed on the rear cover 25 of the motor casing 23 is aligned with the locating mark 48 (shown in FIG. 6) of the detecting device casing 45.

Therefore, in the case where the magnetic pole position detecting device 21 is required to be replaced with a new one, after the bolts 67 are removed to remove the detecting device 21 from the motor casing 23, a new detecting device 21 is coupled to the motor casing 23 with the bolts 67 with the locating mark 48 scribed on the detecting device casing 45 aligned with the locating mark 70 scribed on the rear cover 25 of the motor casing 23, thus allowing the magnetic pole position detecting device 21 to be replaced with a new one simply in a short time at any job site.

In the above embodiment, the motor shaft and the detecting device shaft are coupled with each other by use of the pin 31 and the groove 36. However, it is also possible to adopt other shaft coupling structure which can couple the output shaft 27 of the motor 20 with the input shaft 32 of the magnetic pole position detecting device 21 without angular play between the two.

Further, in the above-mentioned embodiment, since the mounting plate member 42 of the detecting device body 39 of the magnetic pole position detecting device 21 is formed by an elastic plate and further this elastic mounting plate member 42 is fixed to the detecting device casing 45 with bolts 44, it is possible to absorb the thermal expansion and contraction of the output shaft 27 of the motor 20, while preventing the detecting device body 39 from being circumferentially deformed or dislocated relative to the detecting device casing 45 when the device input shaft 32 is being rotated.

What is claimed is:

1. A method of coupling a magnetic pole position detecting device to a brushless dc motor, the dc motor having an output shaft and a motor case, and the magnetic pole position detecting device including a rotor part having an input shaft with a slit indicative of a rotor zero point, a stator part having detecting circuit means for outputting the absolute value of a relative angle between the rotor part and the stator part, and a device case with a scribed locating mark on the surface thereof, said method comprising the steps of:

(a) determining relative angular positional relationships between the rotor part, the stator part and the device case of the magnetic pole position detecting device by i) providing a jig that has a shaft with a pin and a plate having ascribed mark on its surface, and mounting the detecting device to the jig by inserting the pin of the jig in the slit of the detecting device and aligning the scribed mark on the surface of the device case with the scribed mark on the plate of the jig, ii) then adjusting the relative angular positional relationship between the stator part and the rotor part by rotating the stator part until the detecting circuit means outputs a predetermined value, and iii) fixing the stator part relative to the device case;

(b) coupling the output shaft of the motor to the rotor part of the magnetic pole position detecting device;

(c) rotating the shaft of the motor externally; and (d) scribing another locating mark on the motor case in alignment with the mark scribed on the device case, under a condition in which the relative angular positional relationship between the motor case and the device case is such that a back E.M.F. waveform of the motor and a waveform of the absolute value output by the detecting circuit means of the detecting device are in phase.

2. A coupled structure comprising:

(a) a brushless dc motor having an output shaft and a motor case;

(b) a magnetic pole position detecting device including a rotor part having an input shaft with a slit indicative of a rotor zero point, a stator part having detecting circuit means for outputting the absolute value of a relative angle between the rotor part and the stator part, and a device case with a scribed locating mark on the surface thereof, a precise predetermined angular positional relationship being established between the input shaft, the stator part and the scribed locating mark;

(c) a shaft coupling structure including a circumferentially split cylindrical pin elastically expansible in a radial direction thereof projecting radially from an end of one of the output shaft of the brushless dc motor and the input shaft of the magnetic pole position detecting device, and end of the other of the output shaft of the brushless dc motor and the input shaft of the magnetic pole position detecting device having an inner peripheral surface defining an axle hole in the end of said other of the shafts, and an axially extending groove extending in said inner peripheral surface and open to said axle hole, the end of said one of the shafts extending into said axle hole with said pin being received in said axially extending groove; and (d) a locating mark scribed on the motor case and aligned with the locating mark scribed on said device case so that an output signal indicative of positions of magnetic poles of the motor can be determined by the magnetic pole position detecting device.

* * * * *